United States Patent
Hultell et al.

(10) Patent No.: US 10,044,429 B2
(45) Date of Patent: *Aug. 7, 2018

(54) METHODS AND DEVICES FOR CONFIGURING UPLINK TRANSMISSION DIVERSITY

(71) Applicant: Telefonaktiebolaget LM Ericsson (publ), Stockholm (SE)

(72) Inventors: Johan Hultell, Solna (SE); Paulson Angelo Vijay Silveris, Spånga (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/693,937

(22) Filed: Sep. 1, 2017

(65) Prior Publication Data

US 2017/0366245 A1    Dec. 21, 2017

Related U.S. Application Data

(63) Continuation of application No. 13/640,327, filed as application No. PCT/SE2012/050943 on Sep. 6, 2012, now Pat. No. 9,780,861.

(60) Provisional application No. 61/543,008, filed on Oct. 4, 2011.

(51) Int. Cl.
| | |
|---|---|
| *H04W 36/00* | (2009.01) |
| *H04B 7/06* | (2006.01) |
| *H04W 72/00* | (2009.01) |
| *H04W 88/06* | (2009.01) |

(52) U.S. Cl.
CPC ........... *H04B 7/0689* (2013.01); *H04W 72/00* (2013.01); *H04W 88/06* (2013.01)

(58) Field of Classification Search
CPC .............................. H04W 72/00; H04W 88/06
See application file for complete search history.

(56) References Cited

U.S. PATENT DOCUMENTS

| | | | |
|---|---|---|---|
| 8,885,747 B2 * | 11/2014 | Han ...................... | H04B 7/022 370/328 |
| 2012/0207045 A1 | 8/2012 | Pelletier et al. | |
| 2013/0176992 A1 | 7/2013 | Bharadwaj et al. | |

FOREIGN PATENT DOCUMENTS

| | | |
|---|---|---|
| RU | 2388181 C2 | 4/2010 |
| WO | 2010107699 A2 | 9/2010 |
| WO | 2010150662 A1 | 12/2010 |
| WO | 2011085187 A2 | 7/2011 |

OTHER PUBLICATIONS

3GPP, "3GPP TS 25.331 V7.20.0 (Jun. 2011)", Jun. 2011, 1-39, 457-459.

(Continued)

*Primary Examiner* — Gbemileke J Onamuti (74) *Attorney, Agent, or Firm* — Murphy, Bilak & Homiller, PLLC (57) ABSTRACT

Methods and devices are described whereby a User Equipment (UE) and a base station are configured to align the uplink (UL) closed-loop transmit diversity (CLTD) status of the UE and the base station during a serving cell change involving a new base station.

10 Claims, 4 Drawing Sheets

(56) References Cited

OTHER PUBLICATIONS

3GPP, "3rd Generation Partnership Project; Technical Specification Group Radio Access Network; Enhanced uplink; Overall description; Stage 2 (Release 11)", 3GPP TS 25.319 V11.0.0, Jun. 2011, 66, 77-78.

3GPP, "3rd Generation Partnership Project; Technical Specification Group Radio Access Network; Multiplexing and channel coding (FDD) (Release 10)", 3GPP TS 25.212 V10.1.0 (Dec. 2010), Dec. 2010, pp. 1-115.

3GPP, "3rd Generation Partnership Project; Technical Specification Group Radio Access Network; Radio Resource Control (RRC); Protocol specification (Release 10)", 3GPP TS 25.331 V10.0.0 (Jun. 2010), Jun. 2010, 1-44, 536-539, 865.

3GPP, "3rd Generation Partnership Project; Technical Specification Group Radio Access Network; Radio Resource Control (RRC); Protocol specification (Release 10)", 3GPP TS 25.331 V10.3.0 (Mar. 2011), Mar. 2011, pp. 1-1863.

3GPP, "3rd Generation Partnership Project; Technical Specification Group Radio Access Network; Radio Resource Control (RRC); Protocol specification (Release 10)", 3GPP TS 25.331 V10.5.0 (Sep. 2011), Sep. 2011, pp. 1-1882.

3GPP, "Introduction of Uplink Closed Loop Transmit Diversity for HSPA", 3GPP TSG-RAN 1 Meeting #66, R1-113526, Huawei, HiSilicon, Athens, Greece, Aug. 22-26, 2011, pp. 1-105.

Johnson, Chris, "Radio Access Networks for UMTS Principles and Practice", Chapter 6.10 Mobility, Nokia Siemens Networks, UK, John Wiley & Sons, Ltd., 2008, 23 pages.

Unknown, Author, "Dynamic Antenna Selection via HS-SCCH Order for UL CLTD", 3GPP TSG-RAN WG 1 Meeting #66, R1-112064, InterDigital Communications, LLC, Athens, Greece, Aug. 26, 2011, pp. 1-3.

Unknown, Author, "Dynamic Control of UL CLTD via HS-SCCH orders", QUALCOMM Incorporated, "Dynamic Control of UL CLTD via HS-SCCH orders," 3GPP TSG RAN WG1 Meeting #65, R1-111533, Barcelona, Spain, May 13, 2011, pp. 1-4.

Unknown, Author, "On the Benefits of Uplink Closed Loop Transmit Diversity", 3GPP TSG RAN WG1 Meeting #62, R1-104737, Qualcomm Incorporated, Madrid, Spain, Aug. 23-27, 2010, pp. 1-17.

Unknown, Author, "PCI confusion during the RRC connection re-establishment procedure.", 3rd Generation Partnership Project. "PCI confusion during the RRC connection re-establishment procedure." 3GPP TSG-RAN WG2 #67bis, R2-095589, Oct. 12-16, 2009, pp. 1-2, Miyazaki, Japan, Oct. 12-16, 2009, pp. 1-2.

* cited by examiner

METHODS AND DEVICES FOR CONFIGURING UPLINK TRANSMISSION DIVERSITY

RELATED APPLICATIONS

This application is a continuation of U.S. application Ser. No. 13/640,327, filed 10 Oct. 2012, which is a U.S. National Phase application of PCT/SE2012/050943 filed 6 Sep. 2012, which claims benefit of U.S. Provisional Application No. 61/543,008 filed 4 Oct. 2011. The entire contents of each of the aforementioned applications are incorporated herein by reference.

TECHNICAL FIELD

The present invention relates to methods and devices for handling uplink (UL) transmit diversity (TD) and, in particular, to closed-loop TD (CLTD) in a cellular radio system.

BACKGROUND

Third Generation Partnership Project (3GPP) is currently specifying closed-loop transmit diversity (CLTD) features for the uplink (UL) in Rel-11. Uplink transmit diversity (ULTD) schemes use more than one transmit antenna in the User Equipment (UE) to improve the quality of the uplink transmission. The CLTD scheme typically requires the receiver to provide fast feedback information about the spatial channel to assist the transmitter in choosing a transmission format over multiple transmit antennas.

The approach now considered by the 3GPP is that the network (the serving NodeB or the NodeB in the active set pointed out by the Radio Network Controller (RNC) in case no serving cell is configured) decides the precoding vector that shall be used by the UE. A precoding vector includes transmission antenna weights for a set of antennas. The antenna weights are associated with a respective transmit antenna. See also 3GPP Technical Specification 25.212 Multiplexing and channel coding, and 3GPP Technical Specification 25.331 Radio Resource Control (RRC).

There are two ULTD precoding coding schemes "Beamforming" and "Antenna switching." 3GPP has chosen the 'Beamforming' transmitter scheme for the UL CLTD feature. In beamforming, a signal is transmitted from a number of transmit antennas simultaneously with appropriate weighting. Switched antenna diversity implies that one single antenna at a time is used for transmission. In other words, switched antenna diversity implies use of a precoding vector with one transmission antenna weight equal to one, and all remaining transmission antenna weights equal to zero.

There are currently five different UL CLTD configuration modes supported by a UE and the NodeB. In the future, there may be fewer or more different UL CLTD configuration modes. The switching between these modes can be done by dynamic control via Serving NodeB High Speed-Shared Control Channel (HS-SCCH) orders (in case the UE is configured with a serving NodeB). Note further that the switching between at least some of the modes, e.g. CLTD configuration 1 and CLTD configuration 5 can be achieved by synchronised configuration via RNC Radio Resource Control (RRC) reconfiguration messages.

TABLE 1

| UL CLTD configurations | | | | | |
|---|---|---|---|---|---|
| UL CLTD Configuration | DPCCH | HS-DPCCH | E-DPCCH | E-DPDCH | S-DPCCH |
| 1 | | | Primary Precoding Vector | | Secondary Precoding Vector |
| 2 | | | Physical Antenna 1 | | Physical Antenna 2 |
| 3 | | | Physical Antenna 2 | | Physical Antenna 1 |
| 4 | | | Physical Antenna 1 | | De-activate |
| 5 | | | Physical Antenna 2 | | De-activate |

The dynamic activation/de-activation of UL CLTD is important because the transmission from more than two transmit antennas will not be beneficial in certain scenarios, and the NodeB can take control of the situation via HS-SCCH orders (using local information that may not be known at the RNC).

There is a constant desire to improve the performance in cellular radio systems. Hence, there exists a need for new methods and devices providing improved performance in cellular radio systems with UEs configurable for UL CTLD.

SUMMARY

It is an object of the present invention to provide improved methods and devices to address the problems as outlined above.

This object and others are obtained by the methods and devices as set out in the attached claims.

As has been recognized by the inventors, when a UE is configured with UL CLTD, the NodeB can change the CLTD mode that the UE is operating with by means of HS-SCCH orders. This dynamic switching of the CLTD mode is transparent to the RNC, i.e. the RNC does not know which of the five CLTD modes the UE is configured with when operating in CLTD.

One approach to address this would be that the UE remembers the CLTD mode whenever an RRC reconfiguration message from the RNC is received and, for a serving cell change procedure wherein the UE moves from an old serving cell to a new serving:

The old serving cell remains in the active set, and/or
The new serving cell was in the active set prior to the reconfiguration.

This would correspond to the approach used for, e.g., dual-cell High Speed Uplink Packet Access (HSUPA).

As has been recognized by the inventors, if the UE always remembers the CLTD activation status (i.e., CLTD mode in the table above) based on the HS-SCCH orders received from the currently serving NodeB there would be a problem when the serving NodeB is changed based on the RRC reconfiguration message from RNC. This is because the serving cell change will result in a mismatch between the CLTD modes of the UE and the new serving NodeB. The new serving NodeB would, in this case, be forced always to send an HS-SCCH order to the UE to align the CLTD mode of the UE to that of the serving NodeB during serving cell change. Also, the radio channel conditions experienced by the UE with the old serving cell and the new serving cell may be very different and remembering the CLTD mode used in the old serving cell may be negative for transmit diversity performance.

As has further been recognized by the inventors, another problem that can arise is that, if precoded pilot signals are used in CLTD and the precoding weights are not signaled to the NodeB (that is in control of generating Precoding Control Information (PCI) commands) in the uplink by the UE, the precoding weights used by the UE would be unknown to the new serving NodeB upon serving cell change.

For all the reasons specified above there is a need to provide improved configuration methods and devices for UEs and NodeBs with respect to the UL CLTD activation status (i.e., the CLTD configuration in Table 1). This is particularly advantageous when a UE is controlled simultaneously by the HS-SCCH orders and an RRC reconfiguration message.

Thus, in accordance with embodiments described herein methods and devices are described whereby the UE and the NodeB are configured to align the UL CLTD status of the UE and the NodeB during serving cell change involving a new NodeB.

In accordance with one embodiment, when UL CLTD is configured in UE, and the serving NodeB is changed due to an RRC reconfiguration procedure, the UE and the NodeB are configured to use a predetermined CLTD mode. This can typically be one of the five UL CLTD modes currently supported by UE This mode is in accordance with some embodiments set in the standard specification, whereby no signaling is required to determine the predetermined mode.

In accordance with another embodiment, when UL CLTD is configured in a UE, and the serving NodeB is changed due to an RRC reconfiguration procedure, the precoding vector is aligned between UE and network, typically the NodeB.

In accordance with one embodiment, a UE is configured with UL CLTD, and the UE receives an RRC reconfiguration message that indicates a serving cell change procedure. In response to the RRC reconfiguration, the UE sets the UL CLTD mode to a predetermined UL CLTD mode. The predetermined UL CLTD mode can be set in the standard to a default mode or can be signaled to the UE. The signaling can originate in the RNC and transmitted to the UE via a radio base station.

In accordance with one embodiment when a UE is configured with UL CLTD. The UE changes serving cell, wherein the new serving cell is associated with a NodeB. The NodeB to which the UE is changing is then set to a predetermined CLTD mode. The predetermined UL CLTD mode can be set in the standard to a default mode or can be signaled to the NodeB.

In accordance with one embodiment, a UE is configured with UL CLTD using precoding with a Precoding Control Information (PCI) vector The UE receives an RRC reconfiguration message that indicates a serving cell change procedure. In response to the RRC reconfiguration, the UE sets the PCI vector to a predetermined precoding vector. The predetermined precoding vector can be set in the standard to a default vector or can be signaled to the UE.

In accordance with one embodiment, a UE is configured with UL CLTD using precoding with a PCI vector. The UE changes serving cell, wherein the new serving cell is associated with a NodeB. The NodeB to which the UE is changing is set to use a predetermined precoding vector. The predetermined precoding vector can be set in the standard to a default vector or can be signaled to the NodeB.

The invention also extends to User Equipments (UEs) and a radio base stations, e.g., Node-Bs, that are arranged to perform the above methods. The UE and a base station are respectively configured with controllers for performing the above methods from the device side and from the network side. The controllers can be implemented using suitable processing circuitry and may include circuitry that is at least partially configured based on the execution of software. For example, the hardware can comprise one or many processors that can be arranged to execute software stored in a readable storage media. The processor(s) can be implemented by a single dedicated processor, by a single shared processor, or by a plurality of individual processors, some of which may be shared or distributed. Moreover, a processor may include, without limitation, digital signal processor (DSP) hardware, ASIC hardware, read only memory (ROM), random access memory (RAM), and/or other storage media.

BRIEF DESCRIPTION OF THE DRAWINGS

The present invention will now be described in more detail by way of non-limiting examples and with reference to the accompanying drawing, in which.

DETAILED DESCRIPTION

Figure 1:
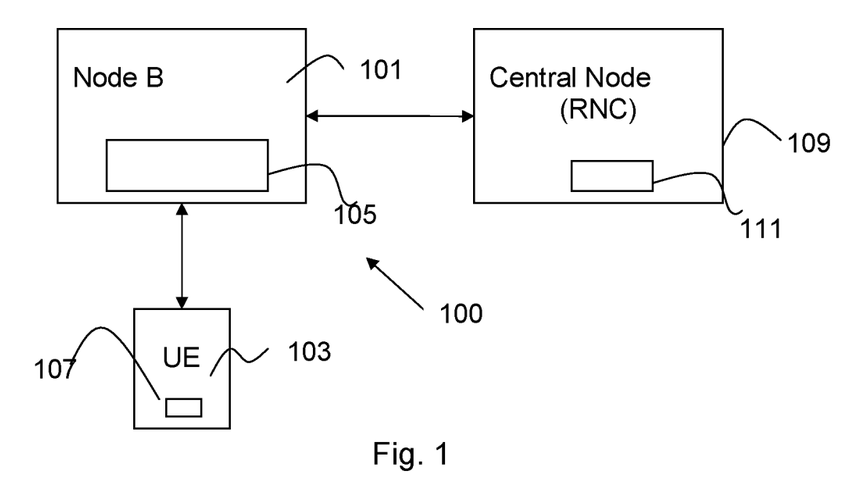
FIG. 1 is a view of a cellular radio system.

In FIG. 1 a general view of a cellular radio system 100 is depicted. The system 100 depicted in FIG. 1 is a UTRAN system. However, it is also envisaged that the system can be another similar system. The system 100 comprises a number of base stations 101, of which only one is shown for reasons of simplicity. The base station 101 can be connected to by user equipments in the figure represented by the UE 103 located in the area served by the base station 101. The UE 103 is enabled to transmit using uplink (UL) closed-loop transmit diversity (CLTD).

Further, the base stations 101 are controlled by a central node such as a Radio Network Controller (RNC) in the case of a UTRAN system. The base station, the central node and the user equipment further comprise controllers/controller circuitry 105, 107 and 111 for providing functionality associated with the respective entities. The cellular radio system 100 is further configured to support UL CLTD. The controllers 105, 107 and 111 can, for example, comprise suitable hardware. The hardware may be at least partially configured based on the execution of software.

The hardware can comprise one or many processors that can be arranged to execute software stored in a readable storage media. The processor(s) can be implemented by a single dedicated processor, by a single shared processor, or by a plurality of individual processors, some of which may be shared or distributed. Moreover, a processor may include, without limitation, digital signal processor (DSP) hardware, ASIC hardware, read only memory (ROM), random access memory (RAM), and/or other storage media.

Figure 2:
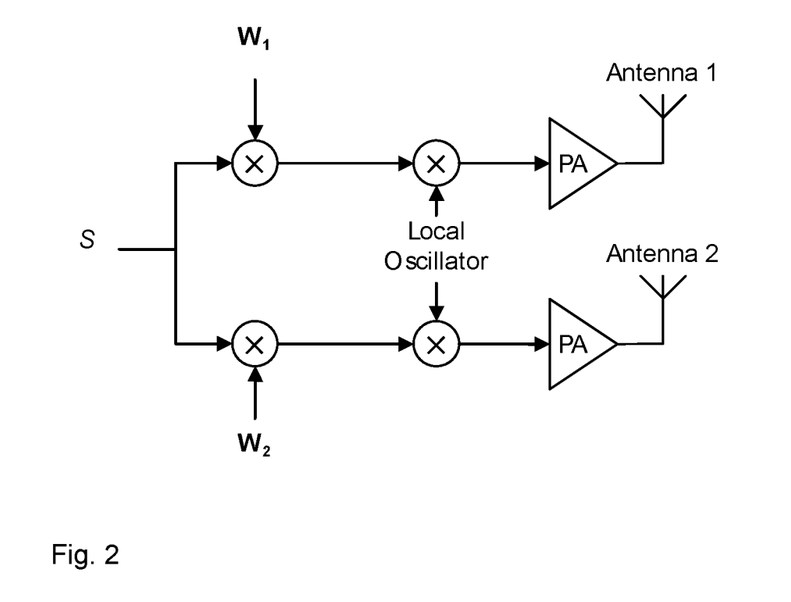
FIG. 2 is a view of a transmitter that can be used for transmission precoding.

Further, FIG. 2 illustrates a transmit diversity transmitter that can be used in a UE to obtain precoding in UL CLTD. The exemplary transmitter in FIG. 2 uses 2 transmit antennas for transmission other numbers of antennas can, of course, be used. Thus, a signal to be transmitted S is fed to the two arms of the respective two antennas used. The signal S is multiplied be the respective weights W1 and W2 obtained from the precoding vector and further multiplied by the oscillation frequency. The respective signals are the amplified in respective power amplifiers (PA) and transmitted via the respective antennas (antenna 1 and antenna 2).

Aligning UL CLTD Mode During Serving Cell Change:

When the serving base station for a UE is changed based on an RRC reconfiguration message from RNC, this will result in a mismatch with respect to the CLTD modes of the UE and the new serving base station is operating with. To resolve this problem, the new serving base station is configured to send an HS-SCCH order to the UE to align the CLTD mode of the UE during serving cell change. Here, "aligning" the CLTD mode involves setting it to be the same for UE and the new serving cell.

Also, the radio channel condition experienced by the UE with the old serving cell and the new serving cell can be different and remembering the CLTD mode used in the old serving cell can negatively impact transmit diversity performance.

Figure 3:
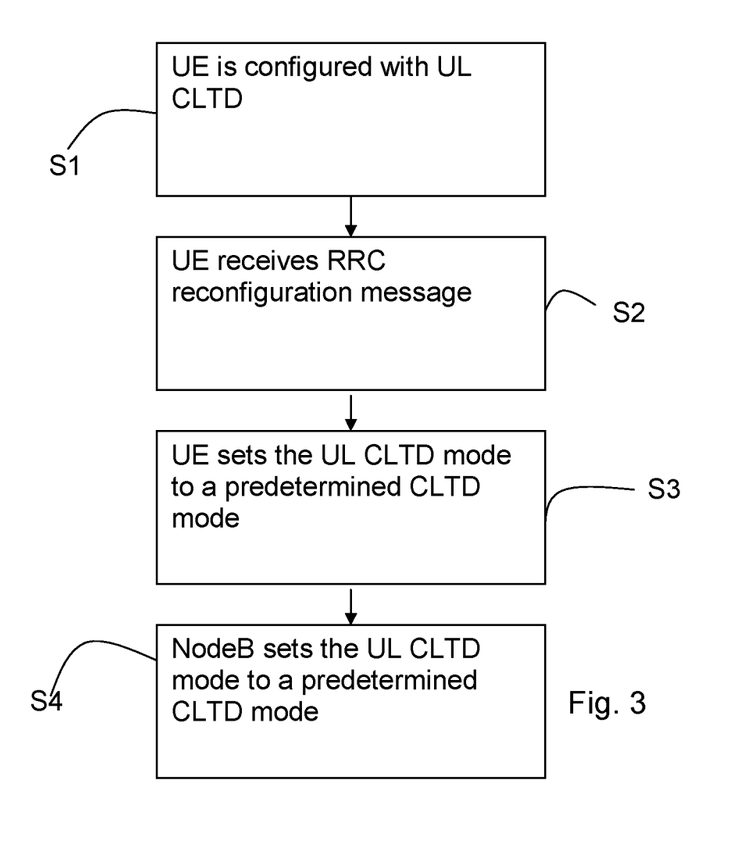
FIG. 3 is a flow chart depicting different steps performed when aligning UL CLTD modes in accordance with one embodiment.

In accordance with some embodiments, the following steps can be performed to solve the CLTD mode mismatch between UE and its base station which are depicted in FIG. 3:

First, in a step S1, a UE is configured with UL CLTD. Next In a step S2 the UE receives RRC reconfiguration message that indicates a serving cell change procedure. Next, in a step S3, the UE sets the UL CLTD mode to a predetermined CLTD mode. Next, in a step S4, the new serving NodeB is also configured to the predetermined CLTD mode. The predetermined CLTD mode can be fixed. For example, the fixed CLTD mode can be one among the five standards-defined CLTD modes. In accordance with some embodiments, the fixed CLTD mode can be hardcoded in UE and base station. In other embodiments, the RNC signals the CLTD mode to the UE and base station.

Aligning the PCI Vector During Serving Cell Change:

During the serving cell change involving a new base station, it will not be possible for the new serving NodeB to know the precoding vector used by the UE, as the precoding vector was decided by the old serving NodeB.

Figure 4:
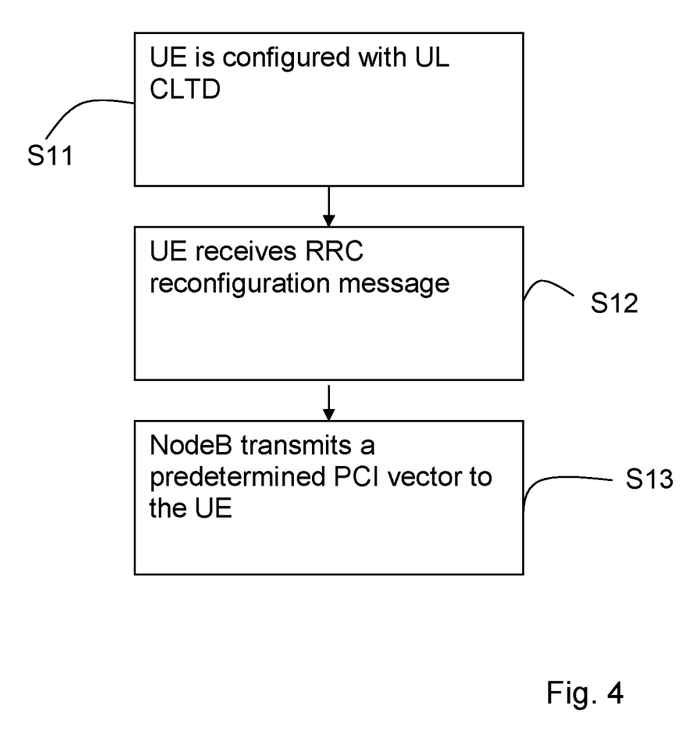
FIG. 4 is a flowchart depicting different steps performed when aligning PCI vectors in accordance with one embodiment.

In accordance with some embodiments, the following steps illustrated in FIG. 4 can be performed whereby the new NodeB can align the Precoding Control Information (PCI) vector used by the UE to the PCI vector used by the new NodeB by transmitting the new PCI vector to the UE:

First, in step S11, a UE is configured with UL CLTD. Next, in a step S12, the UE receives an RRC reconfiguration message that indicates a serving cell change procedure. Thereupon, in a step S13, the new serving NodeB transmits a predetermined PCI vector to the UE (i.e., not based on the estimated radio channel between the UE and the new NodeB).

A drawback that can be encountered when transmitting a predetermined PCI-vector from a new serving NodeB is that the UE may not correctly receive the signaling. Errors at the UE in decoding the signaling indicating the PCI information may result in the UE using the wrong CLTD configuration with respect to the new NodeB. For example, decoding errors at the UE may arise when the quality of fractional precoding control indication channel (F-PCICH) is poor. The F-PCICH is used to transmit PCI information from the NodeB to a UE.

In accordance with an alternative embodiment, a method to overcome the drawback above is provided. In accordance with the alternative embodiment, the UE is configured to always set the PCI vector to a default value, i.e. forget the PCI vector that it has received from the source NodeB during the serving cell change procedure and use a predetermined precoding vector. The pre-coding vector can be fixed and specified in the standard or it can be configurable via signaling, such as RRC signaling.

Figure 5:
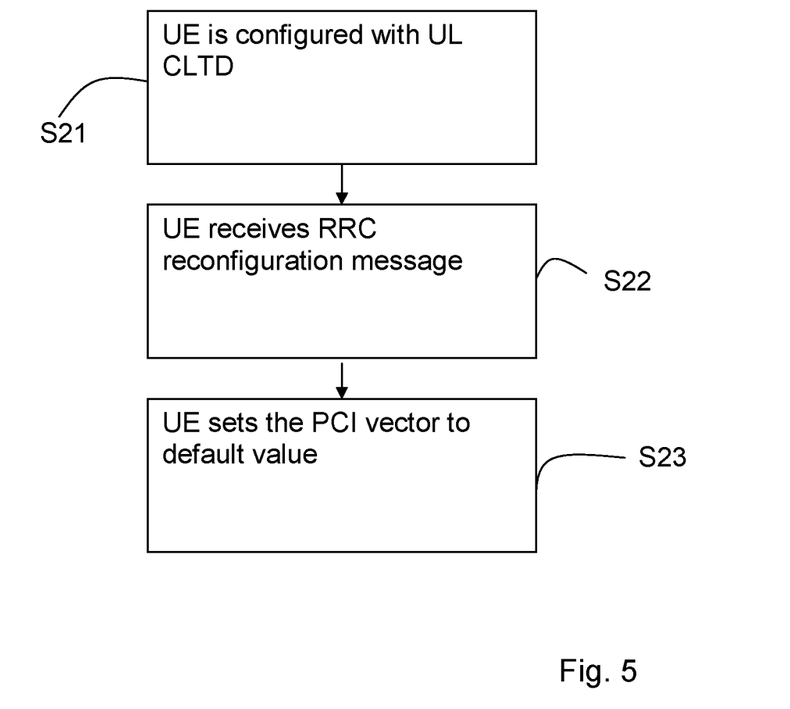
FIG. 5 is a flowchart depicting different steps in accordance with an alternative embodiment.

Thus, in accordance with some embodiments, the following steps illustrated in FIG. 5 can be performed whereby the new NodeB can align the Precoding Control Information (PCI) vector used by the UE to the PCI vector used by the new NodeB:

First, in step S21, a UE is configured with UL CLTD. Next, in step S22, the UE receives an RRC reconfiguration message that indicates a serving cell change procedure. Thereupon, in a step S23, the UE is configured to set the PCI vector to a default value, i.e., forget the PCI that it has received from the source NodeB during the serving cell change procedure and use a predetermined precoding vector. The pre-coding vector can be fixed and specified in the standard, or it can be configurable via signaling, such as RRC signaling.

Using the methods and devices as set out herein can enable the NodeB and the UE to operate in the same CLTD mode even during a handover to a new NodeB. Aside from increasing robustness, and reducing system complexity this will also improve system performance.

What is claimed is:

1. A method of operation in a User Equipment (UE) configured for Uplink Closed-loop Transmit Diversity (UL CLTD), the method comprising: setting a Precoding Control Information (PCI) vector to a default value in response to undergoing a serving cell change procedure that moves the UE to a new serving base station, the PCI vector comprising precoding weights used by the UE for UL CLTD.

2. The method of claim 1, wherein the default value is prespecified value.

3. The method of claim 1, wherein the default value is hardcoded in the UE.

4. The method of claim 1, further comprising receiving the default value via radio signaling.

5. A method of operation in a base station, the method comprising: setting a Precoding Control Information (PCI) vector in the base station to a default value for use with a User Equipment (UE) moving to the base station in a serving cell change procedure, wherein the UE is operating in an Uplink (UL) Closed-loop Transmit Diversity (UL CLTD) configuration and the PCI vector represents precoding weights used by the UE in UL CLTD.

6. A User Equipment (UE) comprising:
communication circuitry configured for wireless communicating with one or more base stations in a wireless communication network; and
processing circuitry operatively associated with the communication circuitry and configured to set a Precoding Control Information (PCI) vector to a default value in response to undergoing a serving cell change procedure that moves the UE to a new serving base station, the PCI vector comprising precoding weights used by the UE for Uplink Closed-loop Transmit Diversity (UL CLTD) operation.

7. The UE of claim 6, wherein the default value is prespecified.

8. The UE of claim 6, wherein the default value is hardcoded in the UE.

9. The UE of claim 6, wherein the processing circuitry is configured to receive the default value via the communication circuitry.

10. A base station configured for operation in a wireless communication network and comprising:
- communication circuitry configured for wirelessly communicating with User Equipments (UEs); and
- processing circuitry operatively associated with the communication circuitry and configured to set a Precoding Control Information (PCI) vector in the base station to a default value for use with a UE moving to the base station in a serving cell change procedure, wherein the UE is operating in an Uplink (UL) Closed-loop Transmit Diversity (UL CLTD) configuration and the PCI vector represents precoding weights used by the UE in UL CLTD.

* * * * *

UNITED STATES PATENT AND TRADEMARK OFFICE
CERTIFICATE OF CORRECTION

PATENT NO. : 10,044,429 B2  
APPLICATION NO. : 15/693937  
DATED : August 7, 2018  
INVENTOR(S) : Hultell et al.

Page 1 of 1

It is certified that error appears in the above-identified patent and that said Letters Patent is hereby corrected as shown below:

In Column 1, Line 9, delete "2012," and insert -- 2012, now Pat. No. 9,780,861, --, therefor.

In Column 2, Line 26, delete "CTLD." and insert -- CLTD. --, therefor.

In Column 3, Line 26, delete "UE This" and insert -- UE. This --, therefor.

In Column 4, Line 22, delete "precoding." and insert -- precoding, --, therefor.

In Column 6, Line 46, in Claim 5, delete "Closed-loop Transmit Diversity (UL CLTD)" and insert -- Closed-loop Transmit Diversity (CLTD) --, therefor.

In Column 6, Lines 50-51, in Claim 6, delete "wireless communicating" and insert -- wirelessly communicating --, therefor.

In Column 7, Lines 10-11, in Claim 10, delete "Closed-loop Transmit Diversity (UL CLTD)" and insert -- Closed-loop Transmit Diversity (CLTD) --, therefor.

Signed and Sealed this  
Twenty-seventh Day of November, 2018

Andrei Iancu  
*Director of the United States Patent and Trademark Office*